United States Patent Office 3,454,641
Patented July 8, 1969

3,454,641
METHOD FOR PREPARING OXIMES FROM CYCLIC OLEFINS
Ellis K. Fields, Chicago, Ill., assignor to Standard Oil Company, Chicago, Ill., a corporation of Indiana
No Drawing. Filed Mar. 4, 1966, Ser. No. 531,771
Int. Cl. C07c *131/02, 131/00*
U.S. Cl. 260—566                    7 Claims

ABSTRACT OF THE DISCLOSURE

A method for preparing oximes from cyclic olefins containing at least one carbon-to-carbon double bond. The cyclic olefins are ozonized in an aqueous or liquid hydrocarbon, alcohol or chloride substituted alkane medium inert to ozone. The reaction medium must contain at least 2 moles of the hydroxylamine per mole of the carbon-to-carbon double bond. The reaction is carried out at a temperature of about —40 to +60° C.

This invention relates to the preparation of oximes. More particularly, it relates to the preparation of oximes from organic compounds containing at least one carbon-to-carbon double bond which comprises ozonizing compounds with ozone in the presence of hydroxylamine in a liquid reaction medium. Recent developments and simplified techniques for ozone preparation make ozone an increasingly important oxidant in large scale oxidation processes and diminish rapidly the traditional ill fame associated with its hazards and costs.

The key for effective application of ozone lies in avoiding ozonide accumulation or isolation prior to the subsequent decomposition by further oxidation reduction or solvolysis. Olefins have been oxidized in the presence of reactive nucleophiles which convert the intermediate carbonyl and zwitterion fragments to a variety of products. Thus, cyclo-olefins with hydroperoxy anions give α,ω-dicarboxylic acids; with ammonia and amines, hydroxyimines, nitrogen heterocycles, or oxaziridines; with hydrogen cyanide, cyanohydrins and subsequently hydroxy acids, hydroxy amides, or amino acids. I have discovered that oximes can be synthesized in good yields by ozonization of organic compounds containing at least one carbon-to-carbon double bond in the presence of hydroxylamine. This is unexpected, as free hydroxylamine is a strong reducing agent and predictably would be readily oxidized by ozone, a strong oxidizing agent.

The method of the invention comprises ozonizing organic compounds containing at least one carbon-to-carbon double bond with ozone in the presence of hydroxylamine in the liquid reaction medium containing at least two moles of hydroxylamine per mole of carbon-to-carbon double bond. The reaction temperature may range from —40 to +60° C.; preferably, the temperature is maintained from —20 to +20° C. Ozone, one to five percent by weight in oxygen or air, is reacted with an aqueous emulsion of free hydroxylamine and the carbon-to-carbon double bond containing organic compound in the ratio of two to six moles of hydroxylamine per mole of carbon-to-carbon double bond desired to convert to the oxime. The reaction rate is dependent upon the rate of addition of ozone to the reaction medium and the reaction is continued until one of two moles of ozone per double bond has been introduced. The oximes are obtained by filtering off the oxime from the reaction mixture, washing it with water and recrystallizing it. In the preferred process, straight chain olefins containing 2 to 24 carbon atoms and 1 to 3 double bonds, and cyclic olefins containing 3 to 24 carbon atoms and 1 to 5 double bonds are used to form oximes.

The liquid reaction system can be homogeneous or heterogeneous, depending on the choice of liquid for the reaction medium. Maximum conversion is obtained in an aqueous (heterogeneous) reaction system containing a stable emulsifier such as Brij 30 (a commercial polyoxyethylene lauryl alcohol). Other liquids that are suitable are hexane, methanol, ethanol, benzene, water, methylene, chloride, carbon tetrachloride, and toluene. The only limitation is that the liquid or solvent be inert to ozone.

Organic compounds containing at least one carbon-to-carbon double bond susceptible to cleavage with ozone can be treated in accordance with the present invention to form oximes. Many organic compounds with a double bond are suspectible to ozonolysis. The olefins and cyclic olefins are particularly useful, giving good yields of the corresponding oxime, but this process can also be applied to other organic compounds containing at least one carbon-to-carbon double bond. Illustrative of such compounds are unsaturated alcohols such as allyl alcohol, crotyl alcohol, cholesterol, fluorocholesterol, cyclohexenol, and cyclopentenol; unsaturated nitriles such as acrylonitrile and crotononitrile; unsaturated acids such as oleic acid, elaidic acid and cinnamic acid; unsaturated ethers such as vinyl ethyl ether and vinyl butyl ether; unsaturated amides such as acrylamide and oleic amide; and substituted aromatic olefins such as p-chlorostyrene, p-nitrostyrene, m-methoxystyrene, and p-fluoro-α-methylstyrene.

Oximes are of great commercial importance, for example, when methylene cyclohexane or dicylohexylidene is ozonized in the presence of hydroxylamine according to the process of the invention cyclohexanone oxime would be formed. This oxime undergoes the Beckmann rearrangement giving caprolatcam which is the basic raw material for the highly commercial product, Nylon six.

The following examples are for illustrative purposes and are not to limit the invention in any way. In the examples, the temperatures are in ° C. The ozone is produced by a commercial ozonator in a concentration of 2.8–3.0 weight percent in oxygen. The gas mixture of ozone and oxygen was introduced into the liquid reaction medium in a stirred reactor, and the vent gases passed through a neutral potassium iodide trap. Ozone introduction was stopped when the concentration of ozone increased in the vent gases, as indicated by the color change in the potassium iodide trap. The usual analytical techniques of elemental analysis, infrared and mass spectroscopy, melting point and/or mixtures melting points were used for product identification.

EXAMPLE I

To a solution of 41.7 g. (0.6 mole) of hydroxylamine hydrochloride in 200 ml. of water were added 5.7 ml. (0.1 mole) of acetic acid and 24 g. (0.6 mole) of sodium hydroxide in 50 ml. of water, cooled to 0°. With stirring, 5 drops of Brij 30 (a polyoxyethylene lauryl ether from Atlas) used as an emulsifier and 22 g. (0.2 mole) cyclooctene were added. The emulsion was ozonized at 0° over a period of 132 minutes. Sodium chloride, 25 g. and 200 ml. of ether were added, and the mixture filtered. The solid was washed with water, dried, and crystallized from ethanol, giving 13.4 g. of suberic aldehyde dioxime melting at 150°. (Rosenmunde and Zetsche, Ber., 54, 2889, give 152° as the melting point.)

*Analysis.*—Calcd. for $C_8H_{16}N_2O_2$: C, 55.8; H, 9.3; N, 16.3. Found: C, 55.6; H, 9.5; N, 16.1. The ether layer was dried and evaporated, giving an additional 3 g. of dioxime. The total yield was 39 mole percent.

EXAMPLE II

The exact procedure and quantities of Example I, used with 33.2 g. (0.2 mole) of cyclododecene, gave 21.8 g. (49% yield) of 1,10-decanedicarboxaldehyde dioxime, melting at 137–9° from benzene. This is a new compound.

*Analysis.*—Calcd. for $C_{12}H_{24}N_2O_2$: C, 63.2; H, 10.5; N, 12.3. Found: C, 63.3; H, 10.2; N, 12.5.

EXAMPLE III

The procedure and quantities of Example I were repeated with 39.2 g. (0.2 mole) of tetradecene-1, giving 17.2 g. (43% yield) of tridecanal oxime, melting at 79–80° C. from hexane (LeSeuer, J. Chem. Soc., 87, 1904, gives 80.5° as the melting point).

*Analysis.*—Calcd. for $C_{13}H_{27}NO$: C, 73.3; H, 12.7; N, 6.6. Found: C, 73.1; H, 12.9; N, 6.4.

EXAMPLE IV

The procedure and quantities of Example I were repeated with 50.4 g. (0.2 mole) of octadecene-1, giving 45 g. (84% yield) of heptadecanal oxime that melted at 87.8° after crystallizing from methanol, then aqueous ethanol (LeSeuer, J. Chem. Soc., 85, 834, gives the melting point as 89.5°).

EXAMPLE V

The procedure and quantities of Example I were repeated with 27.2 g. (0.2 mole) of α-pinene, giving 29.1 g. viscous oil upon evaporation of the ether layer. A portion was distilled to give a viscous yellow oil boiling at 140–150° and 0.35 mm. with some decomposition.

*Analysis.*—Calcd. for $C_{10}H_{17}NO_2$: C, 65.6; H, 9.3, N, 7.7; Calcd. for $C_{10}H_{18}N_2O_2$: C, 60.5; H, 9.1; N, 14.1. Found: C, 64.9; H, 9.5; N, 10.7. From the nitrogen analysis, the product is evidently about a 1:1 mixture of the monoxime and dioxime of acetyl dimethyl cyclobutane acetaldehyde:

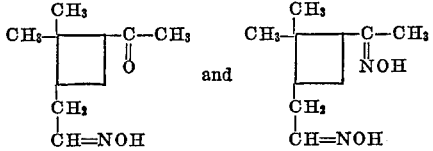

The yield was about 73 percent.

EXAMPLE VI

The procedure and quantities of Example I were repeated with 32.4 g. (0.2 mole) of 1,5,9-cyclododecatriene. The ether-water mixture was filtered, giving 6.7 g. (24% yield) of a white solid, succindialdehyde dioxime, that melted at 170–172° after one crystallization from water (R. Wilstatter and W. Heubner, Ber., 40, 3871 (1907) give 173° as the melting point).

The ether layer of the filtrate was evaporated and the residue was extracted 3 times with 30 ml. of 1:1 hexane: benzene, leaving, after drying, 17.9 g. (40% yield) of brown gummy solid that analyzed for 3,7-decadiene-1,10-dicarboxaldehyde dioxime.

*Analysis.*—Calcd. for $C_{12}H_{20}N_2O_2$: C, 64.3; H, 8.6; N, 12.5. Found: C, 64.8; H, 8.3; N, 12.4.

The foregoing examples thus illustrate the process for the preparation of oximes from organic compounds containing at least one carbon-to-carbon double bond in the presence of hydroxylamines. This process provides a simple and economical means for converting, in one step, organic compounds containing one carbon-to-carbon double bond to the corresponding oximes.

I claim:

1. The method of preparing oximes from cyclic olefins containing 3 to 24 carbon atoms and about 1 to 5 double bonds, which comprises ozonizing the cyclo olefins containing at least one carbon-to-carbon double bond with ozone in the presence of hydroxylamine in water, hexane, methanol, ethanol, benzene, methylene chloride, carbon tetrachloride or toluene reaction medium inert to ozone containing at least 2 moles of the hydroxylamine per mole of the carbon-to-carbon double bond at a reaction temperature of about −40 to +60° C.

2. The method of claim 1 wherein the organic compound is cyclooctene.

3. The method of claim 1 wherein the organic compound is cyclododecene.

4. The method of claim 1 wherein the organic compound is α-pinene.

5. The method of claim 1 wherein the organic compound is methylene cyclohexane.

6. The method of claim 1 wherein the organic compound is dicyclohexylidene.

7. The method of claim 1 wherein the organic compound is 1,5,9-cyclododecatriene.

References Cited

UNITED STATES PATENTS

| | | | |
|---|---|---|---|
| 2,237,365 | 4/1941 | Schlack | 260—566 |
| 3,362,971 | 1/1968 | Mitchell | 260—597 XR |

OTHER REFERENCES

Houben-Weyl, "Methoden Der Organischen Chemie," vol. 7/1, pp. 332–345 (1954).

FLOYD D. HIGEL, *Primary Examiner.*

U.S. Cl. X.R.

260—397.2, 404, 404.5, 465.5, 561

UNITED STATES PATENT OFFICE
CERTIFICATE OF CORRECTION

Patent No. 3,454,641    Dated March 4, 1966

Inventor(s) Ellis K. Fields

It is certified that error appears in the above-identified patent and that said Letters Patent are hereby corrected as shown below:

Column 1, Line 64, instead of the word "of" it should read "until one to two moles of ozone per double bond has been introduced."

Column 2, Line 46, the word should be "mixture" instead of mixtures.

SIGNED AND SEALED
FEB 2 1971

(SEAL)
Attest:

Edward M. Fletcher, Jr.
Attesting Officer

WILLIAM E. SCHUYLER, JR.
Commissioner of Patents